Nov. 10, 1959    A. G. PINCUS    2,912,340
FORSTERITE CERAMIC BODIES
Filed Nov. 10, 1955    2 Sheets-Sheet 1
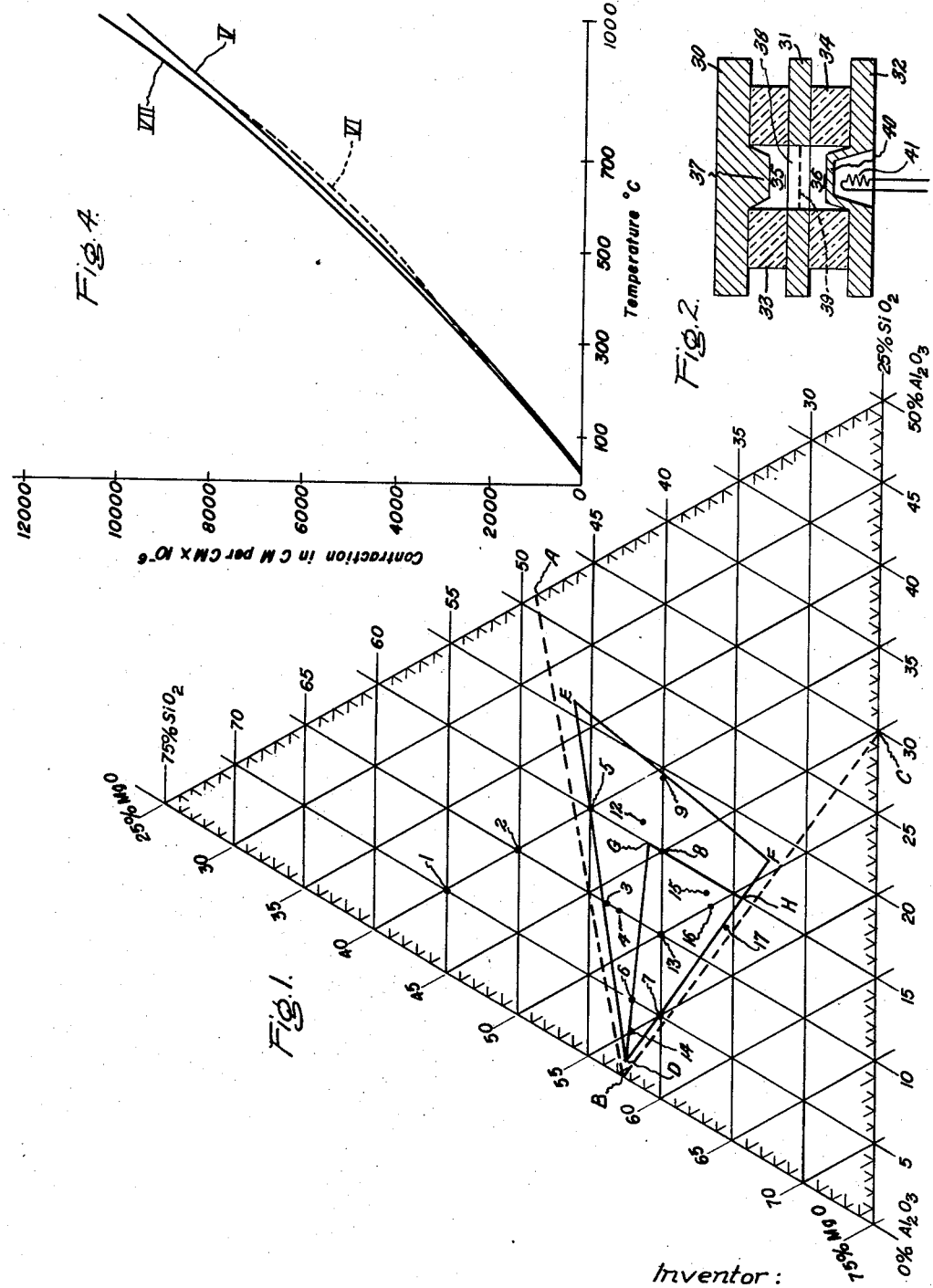
Inventor:
Alexis G. Pincus,
by Paul A. Frank
His Attorney.

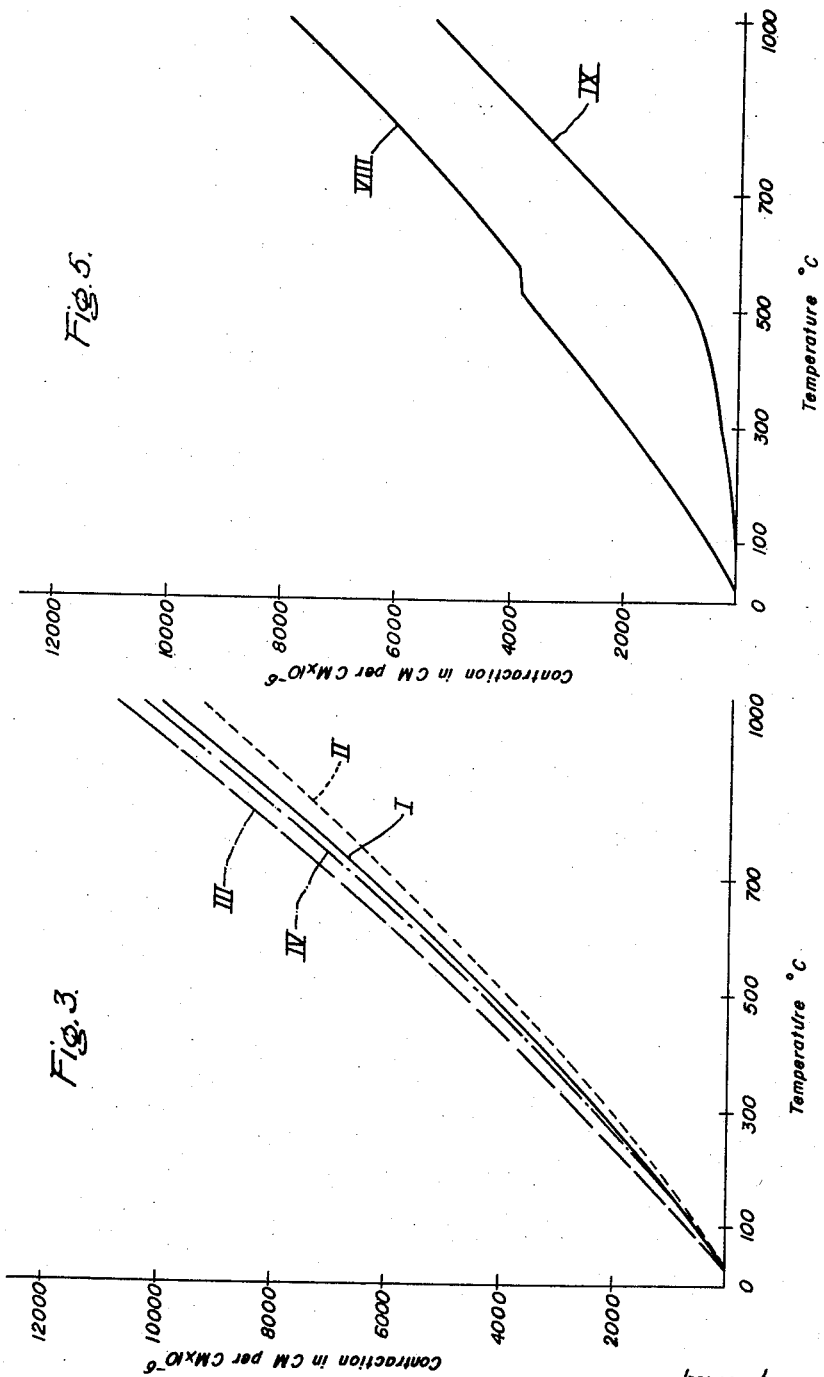

United States Patent Office 2,912,340
Patented Nov. 10, 1959

2,912,340

FORSTERITE CERAMIC BODIES

Alexis G. Pincus, Schenectady, N.Y., assignor to General Electric Company, a corporation of New York Application November 10, 1955, Serial No. 546,215

8 Claims. (Cl. 106—62)

This invention relates to ceramic bodies having the mineral forsterite as the predominant constituent and, more particularly, to such ceramic bodies which are particularly suited for use in the manufacture of composite structures comprising ceramic bodies bonded to metallic bodies of a metal such as titanium.

In the manufacture of evacuated electronic apparatus such as vacuum tubes, increasing use is being made of the metal titanium for structural elements as well as heating and other emission elements. As is well known, the ability of titanium and zirconium to combine with reactive gases at elevated temperatures has been used in the manufacture of electronic tubes to remove small residual amounts of such gases in an operation commonly referred to as "gettering." In the past, however, "gettering" has usually been accomplished by heating a small quantity of a reactive metal such as titanium in the evacuated envelope of the apparatus either immediately after the manufacture is complete or just before it is put in service. This has usually been a single "gettering" operation, the titanium element being exhausted or otherwise rendered inactive after this single operation. With the recent advent of a more plentiful and relatively inexpensive supply of substantially pure titanium, it has become economically feasible to employ titanium metal for structural elements in electronic tube construction in order that the "gettering" operation may extend over the life span of the tube and thereby prolong its gas-free life. In order to simplify tube construction, it is desirable to extend these titanium elements through the ceramic portions of the envelope to form electrical contact with the power source. In a construction of this type it is necessary to provide a vacuum-tight joint between the emerging titanium metal element and the contacting ceramic portions of the envelope which also acts as an electrical insulator therefor. In use the envelope including the ceramic portions and the elements contained therein become heated and, of course, expand. Since apparatus of this type is usually used in an intermittent fashion, periods during which the temperature of the apparatus may reach as high as 700–900° C., are alternated with periods during which the temperature of the apparatus may drop to room temperature or lower. Further, under the conditions of operation recited above, the ceramic must have a power factor of less than 0.002 particularly in the frequency range of $10^{10}$ cycles, be free of gas evolving constituents, be impermeable to gases, have high electrical resistivity, for example, and be capable of forming a strong vacuum-tight permanent bond with titanium.

Previously known ceramic bodies have been deficient in one or more of the previously recited requirements. In particular, difficulty has been experienced in forming a strong vacuum-tight permanent bond with titanium tube structures because of the difference in the coefficients of thermal expansion or contraction of the ceramic and titanium. In general, attempts to produce such a joint in the past have fallen into two main categories. In the first, a "soft" solder has been used where the operating temperature would permit. In this type of construction the "soft" solder material flows plastically to relieve stresses arising from differences in expansion and contraction of the metal and the ceramic. Its disadvantages are that higher operating temperatures may not be used and, further, maximum bake-out temperatures are limited. In the second category, "hard" solders having a higher melting point have been used to permit operation at higher temperatures. In this case, difficulty is experienced with ceramic failure. Attempts to substitute a ceramic having a sufficiently high mechanical strength to withstand the thermally induced stresses have not solved the problem in electronic apparatus, principally because these ceramics have not been capable of forming a strong vacuum-tight permanent bond with titanium.

I have discovered that ceramic bodies having forsterite as the predominant mineral constituent, the particular composition of which will be disclosed in more detail later, have thermal expansion and contraction characteristics matching those of commercial titanium metal, that bodies having this composition may be manufactured to be free of gas-evolving constituents, have excellent dielectric properties in the frequency range of $10^{10}$ cycles and are capable of forming strong, vacuum-tight permanent bonds and composite structures with titanium metal.

It is, therefore, a principal object of my invention to provide a ceramic body having a thermal coefficient of expansion substantially identical to commercial grade titanium metal.

Further, an object of my invention is the provision of a ceramic body having a thermal coefficient of expansion substantially identical to commercial grade titanium metal which additionally has desirable dielectric properties at $10^{10}$ cycles, is free of gas-evolving constituents, and is capable of forming strong, vacuum-tight permanent bonds with titanium.

A still further object of my invention is the provision of a composite body comprising metallic titanium permanently bonded to a ceramic body having an average coefficient of thermal expansion of between 9.4 and $10.4 \times 10^{-6}$ centimeter per centimeter per ° C. in the temperature range of 25° to 700° C.

My invention will be better understood from the following description taken in connection with the accompanying drawing and its scope will be pointed out in the appended claims.

Fig. 1 is a portion of the ternary phase equilibrium diagram of $SiO_2$—$MgO$—$Al_2O_3$ upon which is shown the weight percent composition limits of the ceramics comprising my invention.

Fig. 2 is a sectional semi-schematic view of a vacuum tube embodying ceramic elements permanently bonded to titanium elements.

Figs. 3 to 5 are graphical representations of the linear contraction characteristics of ceramics having compositions shown in Fig. 1 compared with titanium.

The triangular graph illustrated in Fig. 1 is a portion of the ternary phase equilibrium diagram of the $MgO-Al_2O_3-SiO_2$ system in which the compositions of the ceramics of my invention and others of similar composition are shown for purposes of comparison. As will be apparent from inspection, the area of the $$SiO_2-MgO-Al_2O_3$$

diagram shown in Fig. 1 illustrates a range of compositions containing from 25 to 75 weight percent $SiO_2$, 0 to 50 weight percent $Al_2O_3$ and 25 to 75 weight percent MgO.

The forsterite ceramic bodies of my invention provide materials closely matching titanium in thermal expansion, have a surprisingly broad firing range for compositions with so few constituents and higher strength than prior art forsterites when sealed to titanium. Preferably, these bodies have a composition located within the forsterite-spinel-cordierite coexistence triangle shown in Fig. 1 in broken lines ABC and for best results avoid protoenstatite formation and free MgO. These bodies are composed of forsterite and glass, with the appearance of spinel and then cordierite depending on rate of cooling or on a subsequent anneal around 1000° C. Preferably, these ceramics may be produced within the limits enclosed by the triangle formed by the straight lines connecting points D, E, F illustrated in Fig. 1 determined by the three compositions

|   | $SiO_2$ | MgO | $Al_2O_3$ |
|---|---|---|---|
|   | Percent | Percent | Percent |
| D | 42.5 | 56.5 | 1.0 |
| E | 46 | 33 | 21 |
| F | 32.5 | 49.5 | 18 | with vitrification (vacuum tightness) over a practical firing range of temperatures assisted by the $Fe_2O_3$, $TiO_2$, $ZrO_2$, CaO, and NaKO, normally present as impurities even in the purest grades of raw materials. These impurities, however, should not exceed a total amount of about 4 percent by weight of the fired ceramic, and preferably should not exceed 2 percent, particularly if the ceramic is to be used in vacuum tube applications.

A number of ceramic bodies having compositions within and near the above-recited limits were formed and fired at varying temperatures and times. The dielectric properties, thermal contraction characteristics and other physical properties were observed and measured and will be subsequently listed and compared.

In the preparation of these bodies, two general procedures were followed. Certain compositions were prepared from naturally occurring raw materials, i.e., talc and clay with added magnesium hydroxide while others were prepared from pure oxides, i.e., magnesium carbonate or magnesium hydroxide, which decompose to MgO upon firing, alumina (99.9 percent $Al_2O_3$) and a commercial potter's flint (99.9 percent $SiO_2$) preferably in a special ultrafine grind. The naturally occurring raw materials, talc and clay, and the magnesium hydroxide had the following representative analyses of the listed constituents in weight percent based upon the weight of the material before firing. These materials also contained minor amounts of volatile substances such as water and amounts of carbon dioxide (present as carbonates) which are lost on ignition.

TABLE I

Factors used in computing analyses or batches

TALCS

|   | California | Montana |
|---|---|---|
| $SiO_2$ | 59.6 | 62.5 |
| MgO | 29.9 | 30.2 |
| $Al_2O_3$ | 2.1 | 0.3 |
| $Fe_2O_3$ | 0.9 | 1.5 |
| $TiO_2$ | n.d. | tr |
| CaO | 0.9 | tr |
| NaKO | 0.5 | 0.2 |

CLAYS

|   | Ky. Ball Clay | Florida Kaolin |
|---|---|---|
| $SiO_2$ | 51.7 | 47.0 |
| $Al_2O_3$ | 31.2 | 36.8 |
| $Fe_2O_3$ | 1.2 | 0.5 |
| $TiO_2$ | 1.7 | 0.2 |
| MgO | 0.5 | 0.2 |
| CaO | 0.2 | 0.1 |
| NaKO | 0.9 | 0.2 |

$MgCO_3$

|   | Percent |
|---|---|
| Loss on Ignition | 57.4 |
| MgO | 42.6 |

$Mg(OH)_2$

|   |   |
|---|---|
| Loss on Ignition | 31.2 |
| MgO | 68.8 |

$BaCO_3$

|   |   |
|---|---|
| Loss on Ignition | 22.1 |
| BaO | 77.9 |

In the preparation of compositions from these materials, the above analyses of these materials were used in preparing the bodies as is well known in the art.

Batches of the various compositions were prepared by weighing appropriate amounts of the various ingredients into a ball mill containing flint pebbles. A sufficient amount of water was added to obtain a free flowing slip, the amount of water varying from about 2500 to about 3000 cubic centimeters per kilogram of dry ingredients. These mixtures were milled for about four hours. After milling the mixtures were filter pressed, dried, crushed and pulverized with appropriate apparatus. At this point, a precalcining step may be employed if desired, as will be set forth in greater detail later. The pulverized mixtures which were to be formed by pressing were then mixed with an appropriate amount of binder and lubricant, for example, about 7 percent of the weight of the batch of a 10 percent solution of polyvinyl alcohol in water was thoroughly mixed therewith. The mixtures were again pulverized and were formed into suitable bodies by conventional pressing operations at about six tons per square inch. The pulverized materials which were to be formed by conventional extrusion operations were mixed with a greater amount of the binder and lubricant, for example, of 40 percent by weight of the batch of a 17 percent solution of polyvinyl alcohol in water was mixed therewith to form a smooth, putty-like mass. It should be here noted that other satisfactory materials may be used in place of the recited polyvinyl alcohol solutions as a binder and lubricant. For example, glycerin has been found to function equally well.

The formed bodies were then placed in suitable open vessels upon a suitable substrate contained therein comprising sands consisting of silica, magnesia, alumina or zirconia and fired in an air atmosphere in an electrical resistance furnace.

Among many bodies prepared, batches having the following nominal compositions will be more specifically disclosed and described subsequently in the disclosure.

TABLE II

Nominal compositions

| Batch No. | SiO₂ | MgO | Al₂O₃ | BaO |
|---|---|---|---|---|
| | Percent | Percent | Percent | Percent |
| 1 | 55 | 40 | 5 | |
| 2 | 50 | 40 | 10 | |
| 3 | 44 | 46 | 10 | |
| 4 | 43 | 47 | 10 | |
| 5 | 45 | 40 | 15 | |
| 6 | 42 | 53 | 5 | |
| 7 | 40 | 55 | 5 | |
| 8 | 40 | 45 | 15 | |
| 9 | 40 | 41 | 19 | |
| 10 | 42 | 49 | 3 | 6 |
| 11 | 50.5 | 39.0 | 3.3 | 6.0 |
| 12 [1] | 41.4 | 42.6 | 16.0 | |
| 13 [1] | 40 | 50 | 10 | |
| 14 [1] | 42 | 55 | 3 | |
| 15 [1] | 37 | 49 | 14 | |
| 16 [1] | 36.5 | 50 | 13.5 | |
| 17 [1] | 35.5 | 51.5 | 13.0 | |

[1] Batches 12–17 manufactured from pure materials, i.e., alumina, potter's flint and magnesium carbonate.

Certain of these bodies were prepared from batches containing the following proportions in weight percent of the listed raw materials.

TABLE III

| Batch No. | Montana Talc | Florida Kaolin | Magnesium Hydroxide |
|---|---|---|---|
| 1 | 68.5 | 11.1 | 20.4 |
| 2 | 60.3 | 10.9 | 28.8 |
| 3 | 51.6 | 22.0 | 26.4 |
| 4 | 42.2 | 21.4 | 36.4 |
| 5 | 40.0 | 21.8 | 38.2 |
| 6 | 35.4 | 32.4 | 32.2 |
| 7 | 47.3 | 10.4 | 42.3 |
| 8 | 44.4 | 10.3 | 45.3 |
| 9 | 28.2 | 31.6 | 40.2 |

| Batch No. | California Talc | Kentucky Ball Clay | Magnesium Hydroxide | Barium Carbonate |
|---|---|---|---|---|
| 10 | 55 | 3.3 | 35 | 6.7 |
| 11 | 71.1 | 2.6 | 19.5 | 6.8 |

In order to illustrate the accuracy of the actual composition of these bodies with their computed compositions, chemical analyses were performed upon specimen bodies. The following table illustrates the close agreement between the computed compositions and that found upon actual analyses in weight percent.

TABLE IV

Comparisons of actual and computed analyses

| Batch No. | 10 | | 8 | | 1 | |
|---|---|---|---|---|---|---|
| | Computed | Found | Computed | Found | Computed | Found |
| SiO₂ | 41.3 | 41.60 | 39.6 | 39.44 | 54.2 | 53.80 |
| MgO | 48.4 | 48.15 | 44.3 | 43.74 | 39.2 | 39.44 |
| Al₂O₃ | 2.7 | 2.81 | 14.7 | 14.65 | 5.0 | 4.89 |
| Fe₂O₃ | 0.6 | 0.81 | 0.8 | 0.79 | 1.2 | 1.23 |
| TiO₂ | 0.1 | 0.17 | 0.2 | 0.16 | 0.1 | 0.10 |
| MnO₂ | | 0.03 | | | | |
| CaO | 0.6 | 0.59 | 0.2 | 0.50 | 0.1 | 0.20 |
| BaO | 6.0 | 5.95 | | | | |
| NaKO | 0.3 | n.d. | 0.1 | 0.78 | 0.2 | 0.44 |
| | 100.0 | 100.11 | 99.9 | 100.06 | 100.0 | 100.10 |

Pressed bodies composed of compositions listed in Table II were fired as previously described at the following temperatures and for the following times. After firing, the bodies were cooled and inspected for porosity, cracks and surface defects, such as blisters or pimples, and undesirable reaction with the placing sand.

TABLE V

| Batch No. | Fired Temp., °C. | Hours | Condition of Fired Body |
|---|---|---|---|
| 1 | 1,300 | 1 | Porous. |
| | 1,350 | 1 | Vacuum tight. |
| | 1,400 | 1 | Do. |
| | 1,400 | 6 | Porous. |
| 2 | 1,300 | 4 | Do. |
| | 1,325 | 4 | Do. |
| | 1,350 | 1 | Do. |
| | 1,350 | 4 | Do. |
| | 1,400 | 1 | Stuck to placing sand. |
| 3 | 1,325 | 4 | Porous. |
| | 1,350 | 1 | Vacuum tight. |
| | 1,375 | 1 | Do. |
| | 1,400 | 1 | Do. |
| 4 | 1,300 | 1 | Porous. |
| | 1,350 | 1 | Vacuum tight. |
| | 1,375 | 1 | Do. |
| 5 | 1,350 | 1 | Variable, reacted with placing sand. |
| | 1,375 | 1 | Vacuum tight. |
| | 1,400 | 1 | Stuck to sand. |
| | 1,350 | 1 | Porous. |
| 6 | 1,350 | 4 | Vacuum tight. |
| | 1,400 | 1 | Do. |
| | 1,400 | 4 | Do. |
| | 1,450 | 1 | Do. |
| | 1,450 | 4 | Do. |
| 7 | 1,400 | 1 | Porous. |
| | 1,400 | 4 | Vacuum tight. |
| | 1,400 | 6 | Do. |
| | 1,450 | 1 | Porous. |
| | 1,450 | 4 | Vacuum tight. |
| 8 | 1,300 | 1 | Porous. |
| | 1,350 | 1 | Vacuum tight. |
| | 1,400 | 1 | Do. |
| | 1,400 | 3 | Do. |
| | 1,450 | 1 | Do. |
| 9 | 1,300 | 1 | Porous. |
| | 1,350 | 1 | Borderline vacuum tight to porous. |
| 10 | 1,275 | 1 | Vacuum tight. |
| | 1,325 | 1 | Do. |
| 11 | 1,250 | 1 | Do. |
| | 1,300 | 1 | Do. |
| | 1,350 | 1 | Do. |
| 15 | 1,425 | 4 | Porous. |
| | 1,450 | 4 | Vacuum tight. |
| | 1,475 | 4 | Do. |
| | 1,500 | 4 | Do. |
| | 1,550 | 4 | Do. |
| | 1,600 | 4 | Vacuum tight (over-fired). |
| 16 | 1,450 | 4 | Vacuum tight. |
| | 1,500 | 4 | Do. |
| | 1,550 | 4 | Do. |
| | 1,600 | 4 | Do. |
| 17 | 1,450 | 4 | Porous. |
| | 1,500 | 4 | Do. |
| | 1,600 | 4 | Do. |
| | 1,700 | 4 | Do. |

Dielectric test specimens of certain of the above listed compositions were prepared from disks which had been pressed and fired as noted in Table V were tested by conventional techniques and the following properties were determined.

TABLE VI

| Batch No. | Fired Temp., °C. | Hours | K | P.F. | L.F. | Density |
|---|---|---|---|---|---|---|
| 1 | 1,350 | 1 | 5.55 | 0.00069 | 0.0038 | 2.655 |
| | 1,400 | 1 | 5.30 | .00084 | .0045 | 2.615 |
| 3 | 1,350 | 1 | 5.1 | .00085 | .0043 | 2.553 |
| | 1,400 | 1 | 5.3 | .0014 | .0071 | 2.527 |
| 4 | 1,350 | 1 | 5.6 | .0010 | .0057 | 2.673 |
| | 1,375 | 1 | 5.7 | .0015 | .0088 | 2.702 |
| 5 | 1,350 | 1 | 4.8 | .0015 | .0074 | 2.403 |
| 6 | 1,350 | 4 | 6.2 | .00068 | .0042 | 2.492 |
| | 1,400 | 1 | 5.4 | .00077 | .0041 | 2.532 |
| 7 | 1,400 | 4 | 5.6 | .00038 | .0021 | 2.734 |
| | 1,400 | 6 | 5.8 | .00028 | .0016 | 2.739 |
| | 1,450 | 4 | 5.7 | .00033 | .0019 | 2.756 |
| 8 | 1,350 | 1 | 5.6 | .0018 | .0101 | 2.671 |
| | 1,400 | 1 | 5.5 | .0016 | .0090 | 2.605 |
| | 1,450 | 1 | 5.3 | .0015 | .0082 | 2.563 |
| 10 | 1,275 | 1 | 6.3 | .0006 | .0038 | |
| 11 | 1,300 | 1 | 6.6 | .0003 | .0020 | 2.8 |
| 15 | 1,450 | 4 | 6.3 | .0011 | .0069 | |
| | 1,500 | 4 | 6.4 | .0009 | .0058 | |
| | 1,600 | 4 | 6.0 | .00075 | .0045 | |

As shown above, the dielectric properties of the several forsterite bodies were measured at the three centimeter wavelength. The values for dielectric constant (K) and power factor (P.F., expressed as tan $\delta \times 10^4$) were measured from specimens of the respective bodies measuring 1.000 ±0.001 inch by 0.500 ±0.001 inch by quarter wave thickness employing measuring procedures and apparatus well known in the art. For a detailed description of such apparatus and procedures, see "Dielectric Properties of Glasses at Ultra-High Frequencies and Their Relation to Composition," Navias et al., J. Am. Ceram. Soc., 15, 234–251 (1932).

In materials of this type, it is desirable to maintain a low loss factor, L.F. in Table VI, which is a product of the power factor multiplied by the dielectric constant for a given material. Loss factors for materials for this type should be less than about 0.01 and preferably as low as possible. In view of the magnitude of the numbers involved, it is obvious that a comparatively low dielectric constant is to be greatly desired in these bodies. To compare, a test specimen from the barium-containing material of batch 10 was fired at 1275° C. and the dielectric constant measured at a wavelength of three centimeters was found to be 6.3, a value which is considerably higher than that of comparative forsterite ceramics of my invention, for example bodies from batches 3, 4, 5, 6 (fired at 1400° C.), 7 and 8 as seen in the preceding Table VI.

I have found that the power factor of these materials is more directly related to composition. In general, it may be said for compositions in the area outlined by the triangle D, E, F in Fig. 1 that the power factor of these bodies tends to increase with an increase in alumina content. Consequently better dielectric properties, particularly dielectric constant, are to be found in ceramic bodies having compositions located toward and within the left-hand portion of the triangular area D—E—F shown in Fig. 1, and in particular within the triangular area determined by the straight lines connecting points D, G, H of Fig. 1, in which point G is a composition containing about 41 weight percent $SiO_2$, 44 weight percent MgO and 15 weight percent $Al_2O_3$, and point H is a composition containing about 34.5 weight percent $SiO_2$, 50.5 weight percent MgO and 15 weight percent $Al_2O_3$. More specifically, bodies prepared from batches 8, 13, 14, 15 and 16 have excellent mechanical and electrical properties.

One of the contemplated uses of the forsterite ceramics of my invention is as envelope elements of vacuum tubes. An example of such an electronic tube is schematically shown in vertical section in Fig. 2 in which members 30, 31 and 32 are formed disk-like elements of metallic titanium or zirconium or alloys thereof. Members 33 and 34 comprise toroidal elements having central open portions 35 and 36.

Member 30 in this exemplary tube comprises an anode portion 37. Member 31 is a washer-like element having a central aperture 38 across which is provided a screen-like grid member 39 which is in electrical contact with member 31.

Member 32 comprises a cathode portion 40 which may be provided with an electrical resistance heater element 41 as shown.

The several elements 30, 31, 32, 33 and 34 are assembled into an enclosed tube body or envelope as shown. The metallic members 30, 31 and 32 are sealed to the ceramic members 33 and 34 by any known satisfactory soldering or brazing technique such as, for example, as disclosed in U.S. Letters Patent 2,570,248, Kelley, at their abutting surfaces after the interior formed by the communicating spaces 35, 36 and 38 has been evacuated of atmospheric and other gases and subjected to a "bake-out" as is well known in the electronic tube art. Electrical connections may be provided for the anode, grid and cathode elements of such a tube through the exposed portions of members 30, 31 and 32, respectively.

It is desired to fabricate members, such as elements 30, 31 and 32, from relatively pure titanium for reasons stated previously. In view of the thermal cycling to which such tubes are subjected during operation, it is necessary that the ceramic bodies from which elements such as 33 and 34 are formed have thermal expansion and contraction characteristics closely approaching those characteristics of titanium in order that rupture of the ceramic or of the seal between the metallic and ceramic bodies not be broken, thereby destroying the tube. Further, the ceramic bodies must have low dielectric losses, high resistivity and be vacuum tight. Obviously porosity of these ceramics is a characteristic to be avoided. Further, the bulk density of these materials should be maintained as high as practicable. In addition, the ceramic bodies should be free from gas evolving constituents over the operating temperature range and in particular be free from constituents which may evolve substances which progressively "poison" or otherwise deleteriously affect the emission characteristics of the cathode during operation of the tube.

The thermal expansion characteristics of ceramic bodies of my invention were measured and compared to the thermal expansion characteristics of metallic titanium and to ceramic bodies having similar compositions.

TABLE VII

| Batch No. | Fired | | Thermal Expansion Coefficient×10⁶ | | | |
|---|---|---|---|---|---|---|
| | Temp., °C. | Hours | 25–300° C. | 25–500° C. | 25–700° C. | 25–1,000° C. |
| Titanium | | | 8.5 | 9.2 | 9.8 | 10.3 |
| 1 | 1,400 | 1 | | 7.6 | 7.4 | 8.2 |
| 2 | 1,325 | 4 | 1.1 | 1.7 | 3.7 | 5.6 |
| 3 | 1,375 | 1 | 8.4 | 8.6 | 9.4 | 10.3 |
| 5 | 1,350 | 1 | 9.7 | 9.9 | 10.2 | 10.8 |
| 6 | 1,400 | 1 | 9.7 | 9.7 | 10.2 | 10.6 |
| 7 | 1,400 | 4 | 9.0 | 9.7 | 10.4 | 11.3 |
| 8 | 1,400 | 1 | 9.6 | 10.0 | 10.3 | 10.9 |
| | 1,400 | 3 | 7.8 | 8.2 | 8.8 | 9.5 |
| | 1,450 | 1 | 8.1 | 9.2 | 9.8 | 10.5 |
| 10 | 1,275 | 1 | 10.2 | 10.4 | 10.6 | |
| 11 | 1,300 | 1 | 8.8 | 9.1 | 9.7 | 10.5 |
| 13 | 1,400 | 1 | 8.3 | 8.9 | 9.6 | 10.4 |

From the foregoing, it may be readily seen that the bodies from batches 3, 5, 6, 7 and 8 whose compositions are within the triangular area D—E—F in Fig. 1 have thermal expansion and contraction coefficients very close to the corresponding coefficients for titanium, while the bodies from batches 1, 2 and 10 do not have such close agreement thereto. It will be seen that body 11 which has a composition outside the triangular area D—E—F has very good expansion characteristics.

The body from batch 11 has, however, shown itself to be undesirable in that during the sealing of tubes similar to the exemplary tube of Fig. 2, the metallic titanium elements and the ceramic members exhibited a strong reaction resulting in weak bonds, discoloration of the ceramic at sealing surfaces, leaks and blackening of the interior of the tubes resulting in inferior tube performance at elevated temperatures encountered during operating conditions. This undesirable behavior has been attributed to the high barium content of the ceramic. It has been found that the BaO content of the ceramics of my invention should not exceed 1 percent by weight in order to eliminate these difficulties.

In Fig. 3 a graphical comparison is made of the thermal contraction curve of ceramic bodies having the composition of batch 8 fired at different temperatures and times with that for titanium. The solid line curve I represents the linear thermal contraction characteristics of titanium measured in centimeters per centimeter $\times 10^{-6}$ as it is cooled from 1000° C. to room temperature. In the determination of the thermal coefficients of expansion of these materials and titanium, the cooling was accomplished at the normal, power-off rate of the furnace or slightly delayed at the first stages of cooling. The dotted line curve identified by II represents the linear thermal contraction characteristics of a ceramic body of the composition of batch 8 which had been air-fired at 1400° C.

for three hours. The dashed line curve identified by III illustrates the linear thermal contraction characteristics of a ceramic body of the same composition which had been air fired at 1400° C. for one hour. The dash-dot line curve identified by IV is illustrative of the linear thermal contraction characteristics of a ceramic body of the same composition which had been air fired at 1450° C. for one hour. These curves illustrate the effect of the firing temperature and time on ceramics of this type having identical compositions.

The curves in Fig. 4 illustrate the linear thermal contraction characteristics of a ceramic body having the composition of batch 3 fired at 1375° C. for 1 hour compared to the contraction characteristics of titanium measured in centimeters per centimeter $\times 10^{-6}$ while being cooled from 1000° C. to room temperature. The solid line curve identified by V illustrates the linear thermal contraction characteristics of titanium while the dotted line curve identified by VI is illustrative of the behavior of a ceramic body of the composition of batch 3 under identical conditions. Solid line curve VII illustrates the linear thermal contraction characteristics of the same specimen measured 68 days later.

The curves in Fig. 5 illustrate the linear thermal contraction characteristics of a body having the composition of batch 1 and similar characteristics of a body having the composition of batch 2. The upper curve VIII shows the thermal contraction behavior of a body, batch 1, fired at 1350° C. for one hour. As previously shown in Table VIII, this material has coefficients of thermal contraction for the several ranges listed which are considerably lower than titanium and further, the sharp discontinuity exhibited between 500° and 600° C. renders it unsuitable for the manufacture of bonded composite ceramic and titanium bodies for use under temperatures which cyclically vary from room temperature to 700° C. or higher.

The curve IX illustrates the linear thermal contraction characteristics of a body having the composition of batch 2. The well-defined "knee" in this curve clearly shows this ceramic to be unsuitable for bonding to titanium for the previously stated purposes and reasons.

As stated previously, a number of bodies having compositions within the triangular area D—E—F shown in Fig. 1 were prepared from pure materials. By using the previously described pure magnesium carbonate or magnesium hydroxide, alumina and potter's flint, ceramic bodies containing small and controllable amounts of impurities may be produced. Further, by thus controlling the impurities in the composition, better control may be achieved of such properties as density, dimensional stability during firing, dielectric properties, impermeability to gases and freedom from gas evolving constituents. In order that ceramic bodies having these desirable characteristics may be consistently prepared, it has been found desirable to precalcine the constituents prior to the forming and firing operations. It should be noted that precalcination may be advantageously utilized with the naturally occurring raw materials as well as with the pure materials.

A mixture of substantially pure (commercially pure) magnesium carbonate, alumina (99.9% $Al_2O_3$) and finely ground commercial potter's flint (99.9% $SiO_3$ was ground in a ball mill for four hours with sufficient water to obtain a free flowing slip. The ground batch was filter pressed and dried. The dried mixture was fired in an air atmosphere to a temperature of between 1270° C. and 1290° C. over a six and one-quarter day period. The resulting calcine was crushed and pulverized. The powder was ground in a ball mill for eight hours with about 1500 to 2000 ccs. of water per kilogram of dry mixture. The ground mixture was then filtered and dried and prepared for pressing and extrusion in the same manner as the previously recited treatment for the bodies made from the natural minerals.

Bodies formed from this material had a composition corresponding to that of batch 6 and will be hereinafter referred to as batch 6'. Bodies having this composition made from the precalcined pure materials were fired at 1400° C. for one hour and 1450° C. for one hour and found to be vacuum tight. Upon comparison of the properties of bodies 6 and 6' as shown in the following table it will be seen that several advantages may be attained by the use of precalcined pure raw materials.

TABLE VIII

| Batch | Fired | | K | P.F. | L.F. | Density |
| --- | --- | --- | --- | --- | --- | --- |
| | Temp., °C. | Hours | | | | |
| 6 | 1,400 | 1 | 5.4 | 0.00077 | 0.0041 | 2.532 |
| | 1,450 | 1 | 5.5 | .00080 | 0.0044 | 2.668 |
| 6' | 1,400 | 1 | 6.3 | 0.0010 | 0.0063 | 3.000 |
| | 1,450 | 1 | 6.1 | 0.0013 | 0.0079 | 2.904 |

A considerable improvement in dimensional changes during firing, a higher density and a coefficient of thermal contraction which is in good agreement with that of titanium, particularly in the range of 25°–300° C. are achieved using precalcined pure materials as compared to bodies having the same nominal composition made from raw materials. More specifically, cylindrical rod-like elements of batch 6 composition were found to have a firing shrinkage of about 19.5 percent in diameter and 30.4 percent in height when fired at 1400° C. for one hour. Identical elements of batch 6' composition were found to have a firing shrinkage of about 15.8 percent in diameter and 13.5 percent in height under the same firing conditions. Further, the coefficient of thermal contraction for the body having the composition of batch 6' for 25° C. to 300° C. is $8.7 \times 10^{-6}$ cm. per cm. per ° C., for 25° to 500° C. is $9.8 \times 10^{-6}$ cm. per cm. per ° C., for 25° C. to 700° C. is $10.4 \times 10^{-6}$ cm. per cm. per ° C. and for 25° C. to 1000° C. is $11.3 \times 10^{-6}$ cm. per cm. per ° C. It will be seen, however, that the bodies made from the precalcined material have a somewhat higher dielectric constant. However, the power factors are low enough so that the loss factor is acceptably low.

Precalcination may be preferably accomplished in the following manner, if desired. A mixture of magnesium carbonate or magnesium hydroxide and potter's flint as previously described may be prepared containing sufficient magnesium carbonate or hydroxide and $SiO_2$ to form the stoichiometric ratio of forsterite, $2MgO \cdot SiO_2$. Upon firing with the consequent decomposition of the magnesium carbonate or hydroxide to magnesium oxide a composition of about 57.1 percent MgO and about 42.9 percent $SiO_2$ will be achieved. This composition corresponds to point B in Fig. 1 and is substantially pure forsterite. The forsterite composition so produced may then be pulverized and mixed with appropriate amounts of magnesium hydroxide, pure alumina and $SiO_2$ or potter's flint to achieve any desired composition within triangular area D—E—F upon subsequent firing. Bodies having excellent properties may be conveniently formed by firing mixtures of the forsterite composition with alumina alone. These bodies will have compositions lying within the lower triangular area D—G—H providing at least 1.0 weight percent and not more than 15 weight percent $Al_2O_3$ is added to the forsterite composition. Greater homogeneity may be achieved in bodies prepared in this manner in that a maximum amount of forsterite is present in bodies prepared in this manner. Another advantage of this method of preparation is that higher calcining temperatures are practical in that there is a smaller degree of sintering rendering the calcined particles easier to crush.

In order to produce ceramic bodies according to my invention it is necessary that the composition be maintained within the limits of from about 32.5 to 46 weight percent $SiO_2$, 33 to 56.5 percent MgO and 1 to 21 percent $Al_2O_3$, a compositional range included within triangular area D—E—F of Fig. 1, and preferably from 34.5 to 42.5 weight percent $SiO_2$, 44 to 56.5 percent MgO and 1 to 15 percent $Al_2O_3$, a compositional range included within triangular area D—G—H of Fig. 1. I have found that ceramics having compositions outside the area defined by the triangular area D—E—F in Fig. 1 and particularly those having compositions lying in areas in the figure above the line D—E are not stable, i.e., over a period of time, for example, the coefficient of thermal contraction for such bodies has a tendency to change. Further, as shown by the previously disclosed properties, the dielectric properties tend to deteriorate as the alumina content increases and compositions such as that of batch 9 containing about 20 percent or more alumina have a very narrow firing range and tend to be porous. Ceramic bodies containing MgO in excess of those compositions lying along line D—F are undesirable because of the difficulty in obtaining vitrification upon firing. For example, vacuum tight bodies having the compositions of batches 15 and 16 were obtained when fired at temperatures betwen 1450° and 1600° C., while bodies prepared from batch 17 were fired at temperatures as high as 1700° C. without causing vitrification. These non-vitrified bodies had very low mechanical strength and were porous.

The ceramic bodies having compositions within area D—G—H of Fig. 1 were characterized by broader firing ranges to produce vacuum tight bodies, greater stability, coefficients of thermal expansion and contraction very similar to metallic titanium and freedom from gas evolving constituents. In addition, these ceramic bodies possess highly desirable dielectric properties and may be advantageously utilized as disclosed in the manucture of vacuum tubes such as shown in Fig. 2 in addition to other electrical apparatus such as magnetrons, traveling wave tubes, ionization gages, power resistors, capacitors and other apparatus where the unique properties which these ceramics possess may be necessary.

Composite bodies consisting essentially of formed and fired bodies of the ceramics of my invention permanently bonded to titanium bodies have successfully withstood many cycles of temperature variation between room temperature and temperatures of the order of 700° C. for long periods of time. Furthermore, the ceramics of my invention have been incorporated into vacuum tubes similar in construction to that illustrated in Fig. 2 in which formed and fired ceramic bodies of my invention were permanently bonded to titanium elements to form tube envelopes. These tubes were successfully operated for long periods of time under conditions which included thermal cycling between room temperature and 700° C. without developing leaks caused by porosity in the ceramic or mechanical fracture thereof. Further, these ceramic tube elements showed little or no tendency to emit gases.

From the foregoing, it will be seen that I have provided a ceramic material from which strong, stable bodies may be made which have a thermal coefficient of expansion substantially identical to commercial grade titanium metal, which have useful dielectric properties at $10^{10}$ cycles, are free of gas-evolving constituents and are capable of forming strong vacuum-tight permanent bonds with titanium. While I have disclosed particular utility for these ceramics in the manufacture of electronic apparatus, particularly vacuum tube applications, it is to be understood that these particular uses are exemplary only and many other applications will occur to one skilled in the art, for example, in bushings or terminals. I, therefore, do not desire or intend that my invention shall be limited to these several disclosed applications and only intend to limit my invention to the subject matter of the appended claims.

What I claim as new and desire to secure by Letters Patent of the United States is:

1. A forsterite ceramic body consisting essentially of a vitrified mixture of $SiO_2$, MgO and $Al_2O_3$ having compositional limits within the triangular area of the ternary phase equilibrium diagram of the $SiO_2$, MgO and $Al_2O_3$ system bounded by straight lines connecting compositions consisting of about (1) 42.5 weight percent $SiO_2$, 56.5 weight percent MgO, and 1.0 weight percent $Al_2O_3$; (2) 41 weight percent $SiO_2$, 44 weight percent MgO and 15 weight percent $Al_2O_3$; and (3) 34.5 weight percent $SiO_2$, 50.5 weight percent MgO and 15 weight percent $Al_2O_3$, said body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per ° C. to about $10.4 \times 10^{-6}$ centimeter per centimeter per ° C. and matching metallic titanium in thermal expansion and contraction.

2. A forsterite ceramic body consisting essentially of a vitrified mixture of $SiO_2$, MgO and $Al_2O_3$ having compositional limits within the triangular area of the ternary phase equilibrium diagram of the $SiO_2$, MgO and $Al_2O_3$ system bounded by straight lines connecting compositions consisting of about (1) 42.5 weight percent $SiO_2$, 56.5 weight percent MgO, and 1.0 weight percent $Al_2O_3$; (2) 41 weight per cent $SiO_2$, 44 weight percent MgO and 15 weight percent $Al_2O_3$; and (3) 34.5 weight percent $SiO_2$, 50.5 weight percent MgO and 15 weight percent $Al_2O_3$, said body containing less than a total of 4 weight percent of impurities consisting of oxides of iron, titanium, zirconium, calcium, sodium and potassium and less than about 1 weight percent of barium oxide, the body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per ° C. to about $10.4 \times 10^{-6}$ centimeter per centimeter per ° C. and matching metallic titanium in thermal expansion and contraction.

3. A forsterite ceramic body consisting essentially of a vitrified mixture of $SiO_2$, MgO and $Al_2O_3$ having compositional limits within the triangular area of the ternary phase equilibrium diagram of the $SiO_2$, MgO and $Al_2O_3$ system bounded by straight lines connecting compositions consisting of about (1) 42.5 weight percent $SiO_2$, 56.5 weight percent MgO, and 1.0 weight percent $Al_2O_3$; (2) 41 weight percent $SiO_2$, 44 weight percent MgO and 15 weight percent $Al_2O_3$; and (3) 34.5 weight percent $SiO_2$, 50.5 weight percent MgO and 15 weight percent $Al_2O_3$, said body containing less than a total of 2 weight percent of impurities consisting of oxides of iron, titanium, zirconium, calcium, sodium and potassium and less than about 1 weight percent of barium oxide, the body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per ° C. to about $10.4 \times 10^{-6}$ centimeter per centimeter per ° C. and matching metallic titanium in thermal expansion and contraction.

4. A forsterite ceramic body consisting essentially of a vitrified mixture of about 40 to 42 weight percent $SiO_2$, 5 to 7 weight percent $Al_2O_3$ and the balance substantially all MgO with less than 2 weight percent of oxides of iron, titanium, zirconium, calcium, sodium and potassium and less than about 1 weight percent of barium oxide as impurities, said body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per ° C. to about $10.4 \times 10^{-6}$ centimeter per centimeter per ° C. and matching metallic titanium in thermal expansion and contraction.

5. A forsterite ceramic body consisting essentially of a vitrified mixture of about 41.5 to 42.5 weight percent $SiO_2$, 2.5 to 3.5 weight percent $Al_2O_3$ and the balance substantially all MgO with less than 2 weight percent of oxides of iron, titanium, zirconium, calcium, sodium and potassium and less than about 1 weight percent of barium oxide as impurities, said body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per ° C. to about $10.4 \times 10^{-6}$ centimeter per centimeter per ° C. and matching metallic titanium in thermal expansion and contraction.

6. A forsterite ceramic body consisting essentially of a vitrified mixture of about 39 to 41 weight percent $SiO_2$, 9 to 11 weight percent $Al_2O_3$ and the balance substantially all MgO with less than a total of 2 weight percent of oxides of iron, titanium, zirconium, calcium, sodium and potassium and less than about 1 weight percent of barium oxide as impurities, said body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per ° C. to about $10.4 \times 10^{-6}$ centimeter per centimeter per ° C. and matching metallic titanium in thermal expansion and contraction.

7. A forsterite ceramic body consisting essentially of a vitrified mixture of about 36 to 38 weight percent $SiO_2$, 13 to 15 weight percent $Al_2O_3$ and the balance substantially all MgO with less than a total of 2 weight percent of oxides of iron, titanium, zirconium, calcium, sodium and potassium and less than about 1 weight percent of barium oxide as impurities, said body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per ° C. to about $10.4 \times 10^{-6}$ centimeter per centimeter per ° C. and matching metallic titanium in thermal expansion and contraction.

8. A forsterite ceramic body consisting essentially of a vitrified mixture of about 37 weight percent $SiO_2$, about 49 weight percent MgO, and about 14 weight percent $Al_2O_3$, said body being vitrified to the extent that it is vacuum tight and free from continuous porosity and not to the extent that surface defects or cracks are produced, and said body containing crystalline forsterite as the major mineral constituent and containing spinel and glass as minor mineral constituents and being substantially free from protoenstatite and free magnesium oxide and having an average coefficient of thermal expansion between 25° C. and 700° C. of about $9.4 \times 10^{-6}$ centimeter per centimeter per °C. to about $10.4 \times 10^{-6}$ centimeter per centimeter per ° C. and matching metallic titanium in thermal expansion and contraction.

References Cited in the file of this patent
OTHER REFERENCES

| | | |
|---|---|---|
| 5,198 | Cannon | July 24, 1847 |
| 2,100,187 | Handrek | Nov. 23, 1937 |
| 2,163,409 | Pulfrich | June 20, 1939 |
| 2,332,343 | Rigtcrink | Oct. 19, 1943 |
| 2,599,184 | Lathe | June 3, 1952 |
| 2,731,355 | Skinner | June 17, 1956 |

FOREIGN PATENTS

| | | |
|---|---|---|
| 456,459 | France | 1913 |

OTHER REFERENCES

Journal American Ceramic Society, vol. 30, part II of November 1947, pages 79 and 80, Figs. 260–264.

"Ternary System $MgO-Al_2O_3-SiO_2$," by G. A. Rankin and H. E. Merwin from the American Journal of Science, April 1918 (pp. 301–325).